(12) United States Patent
Criswell (10) Patent No.: US 9,682,872 B2
(45) Date of Patent: Jun. 20, 2017

(54) WASTEWATER TREATMENT SYSTEM

(75) Inventor: Denny Allen Criswell, Southlake, TX (US)

(73) Assignee: Denny Allen Criswell, Southlake, TX (US)

( * ) Notice: Subject to any disclaimer, the term of this patent is extended or adjusted under 35 U.S.C. 154(b) by 1293 days.

(21) Appl. No.: 13/401,732

(22) Filed: Feb. 21, 2012

(65) Prior Publication Data

US 2013/0213895 A1  Aug. 22, 2013

(51) Int. Cl.
| | |
|---|---|
| *C02F 1/24* | (2006.01) |
| *B01D 21/01* | (2006.01) |
| *B01D 21/32* | (2006.01) |
| *C02F 1/00* | (2006.01) |
| *C02F 1/52* | (2006.01) |
| *B03D 1/14* | (2006.01) |
| *C02F 1/66* | (2006.01) |
| *C02F 1/56* | (2006.01) |
| *B03D 1/02* | (2006.01) |

(52) U.S. Cl.
CPC ............... *C02F 1/24* (2013.01); *B01D 21/01* (2013.01); *B01D 21/32* (2013.01); *B03D 1/1431* (2013.01); *C02F 1/008* (2013.01); *C02F 1/5209* (2013.01); *B03D 1/028* (2013.01); *C02F 1/5245* (2013.01); *C02F 1/56* (2013.01); *C02F 1/66* (2013.01); *C02F 2209/003* (2013.01); *C02F 2209/005* (2013.01); *C02F 2209/006* (2013.01); *C02F 2209/06* (2013.01); *C02F 2209/10* (2013.01); *C02F 2209/11* (2013.01); *C02F 2209/40* (2013.01)

(58) Field of Classification Search
CPC combination set(s) only.
See application file for complete search history.

(56) References Cited

U.S. PATENT DOCUMENTS

| | | | |
|---|---|---|---|
| 6,577,908 B1 * | 6/2003 | Wojsznis et al. | 700/42 |
| 2008/0046127 A1 * | 2/2008 | Piironen et al. | 700/271 |
| 2008/0047903 A1 * | 2/2008 | Morse | 210/704 |
| 2010/0224569 A1 * | 9/2010 | Mitzlaff et al. | 210/745 |
| 2011/0155255 A1 * | 6/2011 | Ladron De Guevara et al. | 137/3 |
| 2012/0000859 A1 | 1/2012 | Mitzlaff et al. | |

OTHER PUBLICATIONS

Haimi et al. "Process automation in Wastewater Treatment Plants" European Water Association, 2010.*
Han et al. "Optimization of coagulant dosing process in water purification system" SICE, Jul. 29-31, 1997.*
Keskar. "Water Supply Plant Controls" Chapter 8.40 in Process Control and Optimization, Ed. Liptak, 2006, 2172-2193.*
Astrom, K.J. , "Control System Design", Chapter 6: PID Control; 2002, pp. 216-251.

* cited by examiner

*Primary Examiner* — Krishnan S Menon
*Assistant Examiner* — Ryan B Huang
(74) *Attorney, Agent, or Firm* — Michael A. Glenn; Perkins Coie LLP (57) ABSTRACT

A system for treating a wastewater stream produces an effluent having an acceptable level of turbidity. A PID controller is operatively coupled to at least one turbidity meter for monitoring turbidity of the effluent stream. A plurality of chemical treatment additive pumps are provided for adding a plurality of treatment chemicals to the wastewater stream in real time under supervision of the controller, and responsive to monitored turbidity.

16 Claims, 6 Drawing Sheets

WASTEWATER TREATMENT SYSTEM

BACKGROUND OF THE INVENTION

Technical Field

The invention relates to the treating of wastewater to produce a chemically acceptable effluent stream. More particularly, the invention relates to an automated system and method for treating wastewater that controls contaminant levels of a plurality of contaminants present in the wastewater.

Description of the Background Art

The treatment of industrial wastewater is a necessary and difficult task common to most, if not all manufacturing facilities. A vast array of contaminants that are byproducts of manufacturing processes may be removed from the process by a wastewater stream. Accordingly, this wastewater stream carries contaminants in the form of suspended solids that range widely in size, as well as an assortment of liquids, oils, surfactants, polymers, acids, fats, blood, process ingredients, metal salts, total suspended solids (TSS), biological oxygen demand (BOD), chemical oxygen demand (COD), and the like. It is therefore necessary, and typically required, to remove and/or neutralize these contaminants to maintain an effluent stream that meets the minimum standards of wastewater sewage for a given locale prior to releasing the effluent into a sewage system.

A variety of prior art systems for wastewater treatment employing various technical approaches have attempted to solve these problems. Systems employing tanks and weirs for separation of contaminants from liquids through sedimentation have been in widespread use. Sedimentation in holding tanks is often accompanied by utilizing filtration systems, such as filters or screens, to remove small solid particles in the effluent stream. However, filtration systems require a great deal of maintenance and are subject to clogging or partial clogging, thereby impeding flow through a system.

Dissolved air flotation systems (DAF's) have been employed with some degree of success. In DAFs, air bubbles are introduced at a lower portion of a flotation tank to carry particles suspended in the liquid to the surface thereof. The solids at the surface aggregate together, either naturally or through the use of coagulant additives, thereby permitting removal of at least a portion of the solids in the wastewater. Effluent is then drawn from a lower portion of the DAF system. Furthermore, a variety of flotation systems are used where the solids being removed have densities close to that of water.

Additionally, in many wastewater systems the pH of the wastewater stream must be modified to an acceptable level by the addition of acid or bases into the wastewater stream, and frequent testing of pH levels of the effluent to maintain proper pH balance.

Chemical additives are typically required to treat a contaminated wastewater stream. Plant operators typically conduct jar tests wherein a plurality of jars or containers are filled from the wastewater stream, and each is treated with a differing chemical additive, or alternatively a combination of chemical additives, in differing amounts. When multiple additives, such as coagulants and polymers are required to treat the wastewater, a plurality of jar tests are required to test various combinations of additive amounts to determine which combination results in an effluent that is acceptable for discharge from the system.

The requisite amount of chemical additives necessary to treat the wastewater are then recorded, and the flow rate of each additive must then be calculated based upon the rate of flow of wastewater into the treatment system. Once the proper flow rates are established the chemical additives are typically supplied to the system by pumps, which must be set to deliver the proper additive flows.

One great difficulty of this system of wastewater treatment is that, if the wastewater input stream changes appreciably, the additives must be readjusted, thereby requiring additional jar tests. Additionally, a change in wastewater stream flow requires the pumps to be adjusted because the proportion of additives must be adjusted proportionally to the wastewater stream flow. Furthermore, in many manufacturing environments it is impractical to train personnel to monitor the effluent stream, conduct periodic and frequent jar tests, calculate additive flow rates, make pump adjustments, and carefully monitor incoming stream flow rates in order to maintain the treatment system's operation.

Attempts have been made to automate this process (see, for example, U.S. patent publication no. 2012/0000859), but the results obtained using such systems have been less than satisfactory. Such systems use a programmable logic controller (PLC) to perform jar tests that derive a water treatment chemical dosage. This dosage is then implemented and maintained via a proportional feed, i.e. chemical-to-water flow. A nephelometer is used in such system to measure turbidity in Nephelometric Turbidity Units (NTU). The NTU meter and controller then function to provide an output value that is used to start another jar test, and the process repeats. Such system does not provide real time chemical additions. Thus, while such system, especially with the up-front NTU meter, may cut down the back feed time for providing clarity values to the controller, it uses that time and more due to the need to wait for the completion of the jar tests. Such delay compromises both the accuracy of any measurements made and the integrity of removal of contaminants from the effluent stream.

Accordingly, there is a need for an automated wastewater treatment system that is capable of monitoring an effluent stream for out of range contaminant levels and for adjusting additive flow rates accordingly.

SUMMARY OF THE INVENTION

An embodiment of the invention obviates the aforementioned problems inherent in the prior art by providing a system and method of wastewater treatment that produces an effluent stream within an acceptable turbidity/pH range without the need for costly and time-consuming jar tests typically practiced in the art.

Specifically, the invention uses a controller, for example an industrial controller having a microprocessor, data memory, and a plurality of inputs and outputs that interface with various system components, as set forth in greater detail below. The controller is operatively coupled to a turbidity/pH meter, or a plurality thereof, that provides a signal representative of turbidity/pH at a point or points in the effluent stream for determining whether the effluent stream is within an acceptable turbidity/pH.

A plurality of pumps are provided for supplying a plurality of chemical additives to the wastewater stream to control the turbidity/pH thereof. Each pump is operatively coupled to the controller, whereby the controller supplies a plurality of flow rate set point signals that are used to determine the proper balance of additives supplied to the wastewater stream to produce the best turbidity reading.

The system herein adds chemicals based upon a properly tuned PID controller. With regard to the derivative and integral terms, the system operates such that the controller does not automatically increase chemical additives merely because flow goes up. Rather, the system herein disclosed increases chemical additives as a reaction to the flow and the water clarity, and it only does this in a PID format. The further away from the set point, regardless of flow rate, the faster the system drives the chemical feed pump. It does this using a sampling interval that is set, e.g. at 95% of a minute.

In an embodiment, the NTU meter looks at the clarity of the water every 57 seconds and makes a chemical feed change, if needed, as a function of a derivative. In the case of multiple chemicals, the limit is to feed the chemicals as a proportion unto themselves, e.g. for every ppm of coagulant, the system feeds 2 ppm of flocculent. In an embodiment, the PLC is also used to feed acids and bases, again in PID formats.

DETAILED DESCRIPTION OF THE INVENTION

An embodiment of the invention obviates the aforementioned problems inherent in the prior art by providing a system and method of wastewater treatment that produces an effluent stream within an acceptable turbidity/pH range without the need for costly and time-consuming jar tests typically practiced in the art.

Specifically, the invention uses a controller, for example an industrial controller having a microprocessor, data memory, and a plurality of inputs and outputs that interface with various system components, as set forth in greater detail below. The controller is operatively coupled to a turbidity meter, or a plurality thereof, that provides a signal representative of turbidity at a point or points in the effluent stream for determining whether the effluent stream is within an acceptable turbidity.

A plurality of pumps are provided for supplying a plurality of chemical additives to the wastewater stream to control the turbidity thereof. Each pump is operatively coupled to the controller, whereby the controller supplies a plurality of flow rate set point signals that are used to determine the proper balance of additives supplied to the wastewater stream to produce the best turbidity/pH reading.

A key aspect of the invention herein involves the use of a PLC comprising a proportional-integral-derivative (PID) controller, which is a control loop feedback mechanism. A PID controller calculates an error value as the difference between a measured process variable and a desired set point. The controller attempts to minimize the error by adjusting the process control inputs.

The PID controller calculation herein (algorithm) involves three separate constant parameters, and is accordingly sometimes called three-term control: the proportional, the integral, and derivative values, denoted P, I, and D.

Heuristically, these values can be interpreted in terms of time:
P depends on the present error;
I on the accumulation of past errors; and
D is a prediction of future errors, based on current rate of change.

The weighted sum of these three actions is used to adjust the addition of chemicals to the effluent stream via a control element, e.g. the position of a control valve or the power applied to a pump.

By tuning the three parameters in the PID controller algorithm in an embodiment, such tuning involves inputting the proper gain values for all three of the loops (P, I, and D). Because these loops are all interdependent, a number of tuning devices are used for both on-line tuning, as well as off-line tuning. Depending upon the equipment available and the objective of the system of interest, the first tuning is performed off-line. The system is then brought on-line and the loops fine tuned to provide the desired performance.

The controller provides control action designed for specific process requirements, such as a desired water turbidity/pH value. The response of the controller can be described in terms of the responsiveness of the controller to an error, the degree to which the controller overshoots the set point, and the degree of system oscillation. In particular the controller may be set to meet a performance, costing or a combination of performance and costing objectives. For example, in a system that is installed where compliance is paramount, the controller is set with a high gain on the proportional and integral values to insure a quick and thorough response to an elevation in contamination in the effluent. This leads to an acceptable level of chemical over-feed and the subsequent costs associated with it. Conversely, a system may be tuned to provide maximum cost efficiency by inputting lower values for the proportional and integral gains and a higher gain for the derivative function. This leads to a less responsive system that minimizes chemical over-shooting and the subsequent cost associated with it, while keeping the system in compliance. Depending upon the contaminants and the acceptable levels, either strategy could be used successfully.

The PID control scheme is named after its three correcting terms, whose sum constitutes the manipulated variable (MV). The proportional, integral, and derivative terms are summed to calculate the output of the PID controller. Defining u(t) as the controller output, the final form of the PID algorithm is:

$$u(t) = MV(t) = K_p e(t) + K_i \int_0^t e(\tau)\,d\tau + K_d \frac{d}{dt} e(t)$$

where
$K_p$: Proportional gain, a tuning parameter
$K_i$: Integral gain, a tuning parameter
$K_d$: Derivative gain, a tuning parameter
e: Error=SP−PV
t: Time or instantaneous time (the present)

The contribution from the integral term is proportional to both the magnitude of the error and the duration of the error. The integral in a PID controller is the sum of the instantaneous error over time and gives the accumulated offset that should have been corrected previously. The accumulated error is then multiplied by the integral gain ($K_i$) and added to the controller output.

The integral term is given by:

$$I_{out} = K_i \int_0^t e(\tau)\,d\tau$$

The integral term accelerates the movement of the process towards the set point. In an embodiment of the invention, the integral term is used to achieve the desired effluent quality, the value of which is pre-set, in the fastest time possible with minimal chemical over-shoot.

In particular, and given the interdependency of each loop, the gain for the integral is set at the highest value possible for the quickest system recovery. This ensures that the water quality is returned to an acceptable level for discharge in the shortest time possible. For example, a system with a large amount of variation in contaminant loading requires a higher gain in the integral function to accommodate its loading swings. An integral gain set too low allows the system to run for an unacceptably long period of time outside of the acceptable range. Conversely, a system with a low amount of variation in contaminant loading requires a lower gain in the integral function.

The derivative of the process error is calculated by determining the slope of the error over time and multiplying this rate of change by the derivative gain $K_d$. The magnitude of the contribution of the derivative term to the overall control action is termed the derivative gain, $K_d$.

The derivative term is given by:

$$D_{out} = K_d \frac{d}{dt} e(t)$$

The derivative term slows the rate of change of the controller output. Derivative control is used to reduce the magnitude of the overshoot produced by the integral component and improve the combined controller-process stability. In an embodiment of the invention, the derivative term is used to allow for a rapid response dosing scheme, achieved with a proper gain in the integral loop, without over dosing the system due to an over-shoot.

In particular, and given the interdependency of each loop, the derivative gain is set at the highest value possible to ensure the lowest chemical over-shoot. For example, a system with a small amount of variation in contaminant levels could be run with a large gain value. This ensures that the small changes in chemical dosages necessary are done with a minimal amount of over-shooting. Conversely, a system with a large amount of variation in the levels of contamination needs a smaller derivative gain inputted to allow the system to make a quick recovery back to the desired set point. That set point being the one that gives the desired water quality for the concentration of contaminants being treated.

In prior art systems, which are not automated and which are, at best semi-automated, in a properly sized separation device there is typically less that 40 minutes of retention, which means that the half-life of a treatment solution is about 20 minutes. In contrast thereto, the herein disclosed controller responds uniformly to an NTU output in worse case scenarios at one-half of a half-life.

The system herein adds chemicals based upon a derivative term. With regard to the derivative term, the system operates such that the controller does not automatically increase chemical additives merely because flow goes up. Rather, the system herein disclosed increases chemical additives as a reaction to the flow and the water clarity, and it only does this in a derivative format. The further away from the set point, regardless of flow rate, the faster the system drives the chemical feed pump. It does this using an interval term that is set, e.g. at 95% of a minute. In this example, the NTU meter looks at the clarity of the water every 57 seconds and makes a chemical feed change, if needed, as a function of a proportional, integral, and derivative output. In the case of multiple chemicals, the limit is to feed the chemicals as a proportion unto themselves, e.g. for every ppm of coagulant, the system feeds 2 ppm of flocculent. In an embodiment, the PLC is also used to feed acid and bases, again in derivative formats.

Figure 1:
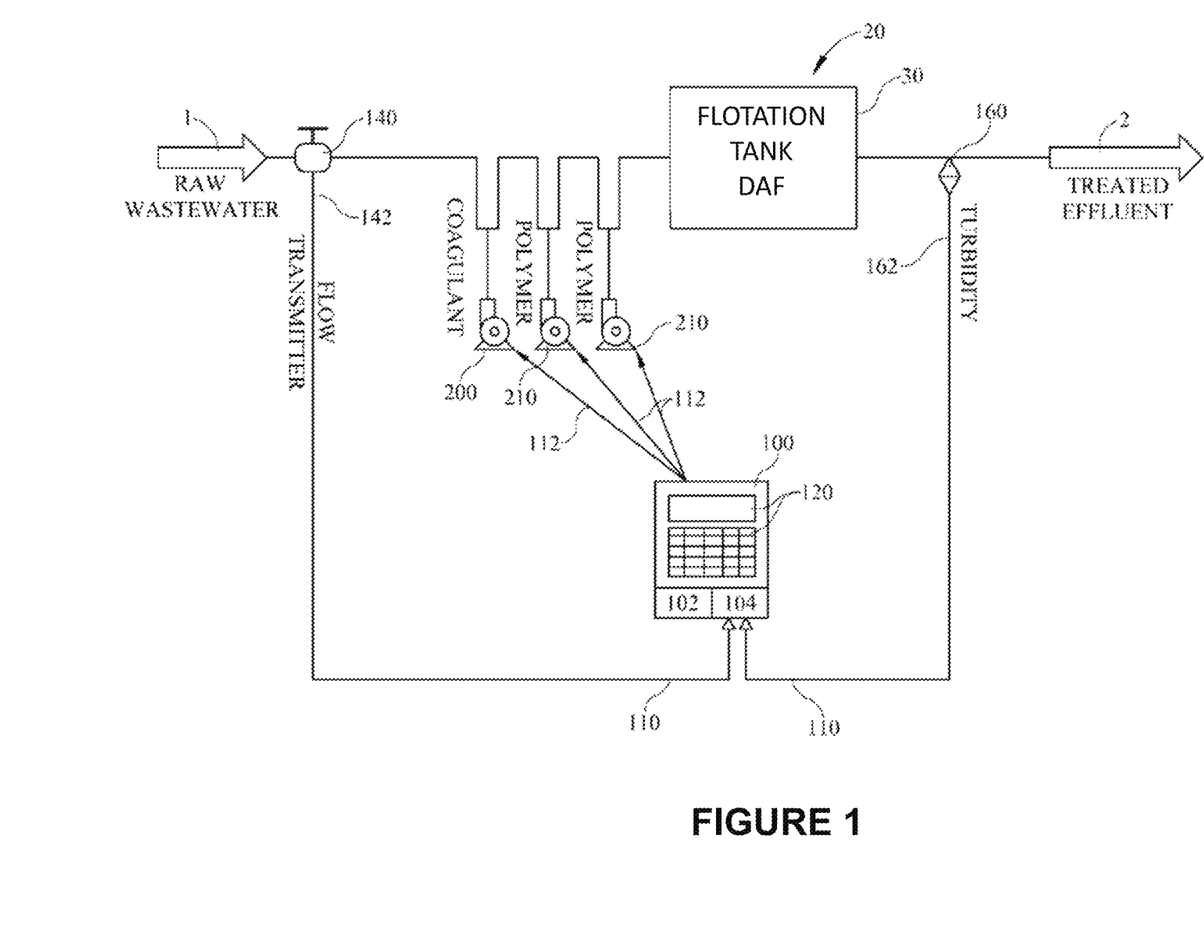
FIG. 1 is a block diagram of a wastewater control system in accordance with one embodiment of the invention.

In FIG. 1, a system for treating a wastewater stream 1 produces an effluent stream 2 having a contaminant concentration below a predetermined threshold. An embodiment comprises a wastewater treatment facility 20 having a settling clarifier or dissolved air flotation tank (DAF) 30, a wastewater inlet 40 for providing contaminated wastewater to tank 30, and an effluent outlet 50 for withdrawing treated wastewater 1 from tank 30. Furthermore, a plurality of floc (or flocculent) tubes 60 (see FIG. 2), or any other type of mixing device, may be provided between inlet 40 and tank 30 to mix wastewater 1 with treatment chemicals prior to its introduction into tank 30.

The tank 30 may comprise a dissolved air flotation device (hereinafter DAF) for introducing air bubbles into wastewater 1, thereby aiding in separation and flotation of coagulated solids to the surface of tank 30. It should be noted that throughout this specification for purposes of clear explication the invention will be described in the context of operation within a DAF wastewater treatment facility. However, the invention may be practiced in conjunction with a broad spectrum of wastewater filtration systems, such as sedimentation systems, clarifiers, separators, equalization tanks, and the like, without departing from the scope of the invention.

Figure 2:
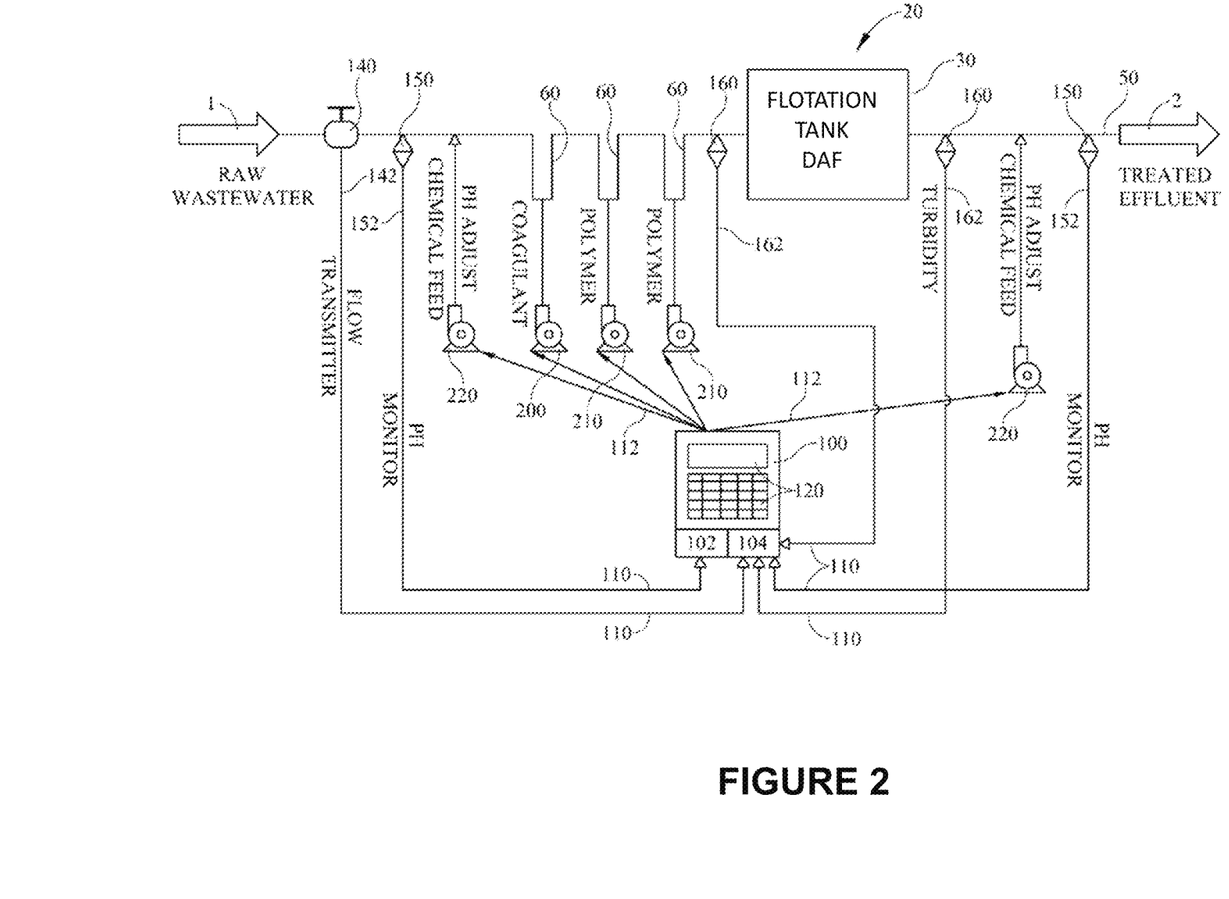
FIG. 2 is a block diagram of a wastewater control system in accordance with a further embodiment of the invention.
Figure 3:
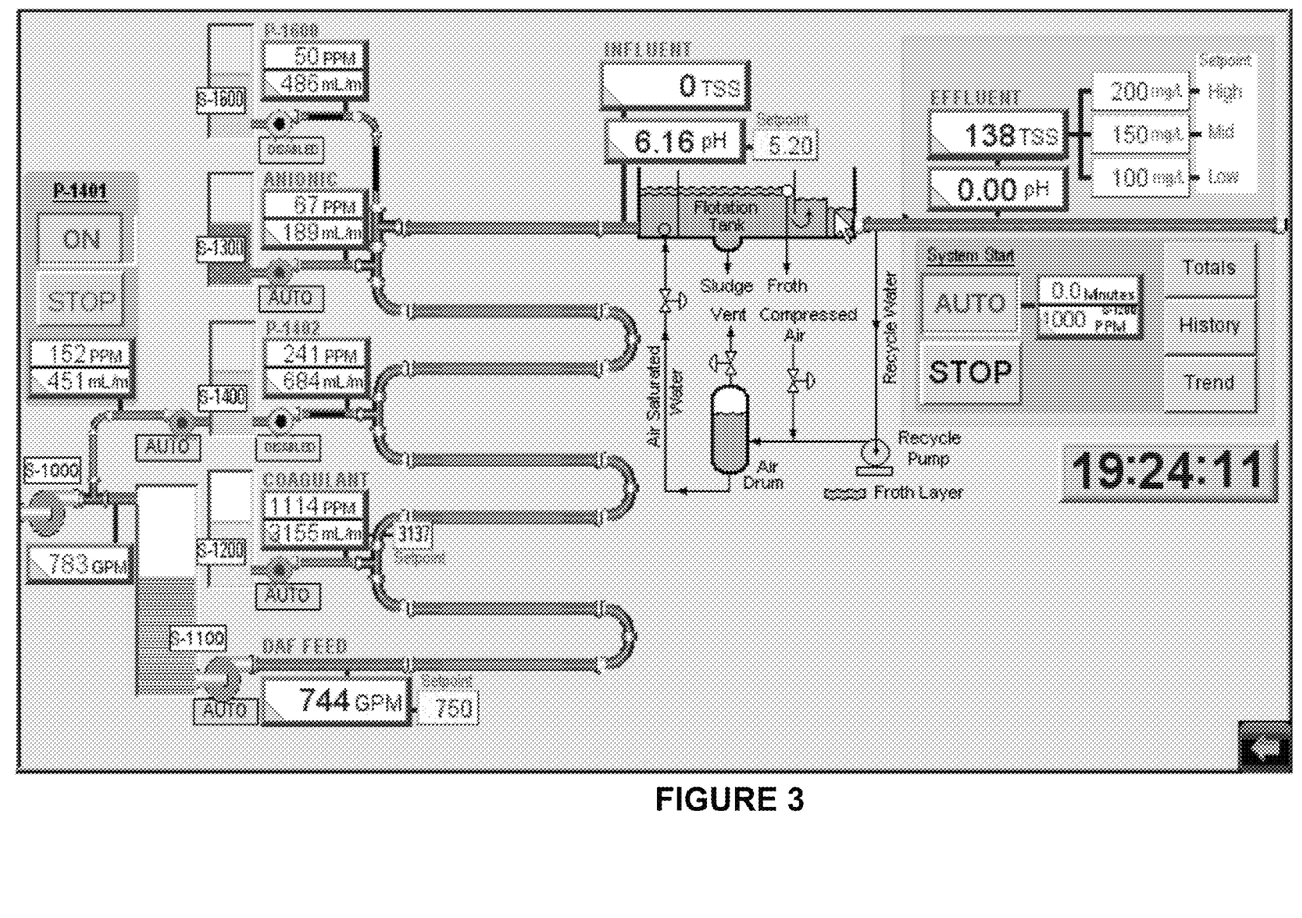
FIG. 3 is a block schematic diagram of a user interface according to the invention.

The exemplary system further comprises a controller 100 having a microprocessor 102, or a plurality thereof, and concomitant data memory 104 for storing process variables. The controller 100 further comprises a plurality of inputs 110 for accepting electrical signals from system components and a plurality of outputs 112 for supplying signals to system components. Additionally, an operator interface 120 may be operatively coupled to controller 100 to enable a user to monitor and control system operation, as discussed further herein below. The controller 100 may comprise one of many commercially available controllers including but not limited to programmable logic controllers (PLC's) having configurable input and output cards, distributed logic controllers, personal computers, or proprietary microprocessors having the requisite inputs and outputs to control the system. Furthermore, the operator interface 120 may comprise one of many commercially available operator interfaces using video displays, touch screens, keyboards and the like to permit user control of the system. FIG. 3 provides an example of a user interface in accordance with an embodiment of the invention herein In an embodiment, the system further includes a flow meter 140 disposed in the wastewater inlet 40 line, capable of measuring the flow rate of wastewater through inlet 40. The flow meter 140 may comprise a flow output signal 142 representative of wastewater flow operatively coupled to an input 110 of the controller 100, whereby the controller 100 monitor is the flow rate of wastewater entering the system. As shown in FIG. 2, a pH meter 150 may be provided proximate the inlet 40, having an output 152 that is representative of the pH of the wastewater stream prior to treatment, which output 152 is operatively coupled to an input 110 of the controller 100. Additionally, a pH meter 150 may be disposed proximate the effluent outlet 50, such that the controller 100 may monitor pH in the effluent stream.

As best seen in FIGS. 1 and 2, a turbidity meter 160 is provided in fluid communication with the effluent outlet 50 for measuring the clarity of treated wastewater effluent. The turbidity meter 160 comprises an output 162 representative of turbidity, as measured by any one of several standards, including Nephelopmetric Turbidity Units (NTU) or Jackson Turbidity Units (JTU). The turbidity meter is operatively coupled to an input 110 of the controller 100. For purposes of explication only the specification will refer to the measure of turbidity in NTU's.

FIG. 2 depicts an alternative embodiment of the invention, wherein a second turbidity meter 160 is provided in the wastewater stream 1 at a point downstream of the floc tubes 60 (or other mixing device), but upstream of entry into the tank 30, for monitoring the turbidity of wastewater 1 that has been treated in the floc tubes 60, as will be discussed in greater detail herein below.

The system further comprises a plurality of additive pumps for supplying metered quantities of chemical additives to wastewater stream 1. FIG. 1 depicts an embodiment of the system having three additive pumps: a coagulant pump 200, and a pair of polymer pumps 210. Each pump is in fluid communication with the wastewater stream 1 proximate the inlet 40 and floc tubes 60, and upstream of the turbidity meter 160, whereby a metered flow of coagulant and polymers may be supplied to wastewater stream 1. Pumps 200 and 210 are operatively coupled to the outputs 112 of the controller 100, which provides an electrical signal representative of a desired additive flow rate to pumps 200 and 210, whereby the controller 100 may meter chemical additives being supplied to the system based upon desired effluent turbidity or other contaminant measures.

In one embodiment of the invention, the pumps 200 and 210 may comprise positive displacement pumps or other commercially available pumps that are capable of accurately metering fluid from a storage tank (not shown) to the system. The pumps 200 and 210 may be operated by providing an output 112 to a variable frequency drive which, in turn, varies the rotational speed of the shaft of an electric motor used to power pumps 200, 210, as is known in the art. Alternatively, various metering pumps capable of delivering measured fluid volumes may be employed without departing from the scope of the invention.

Typically, the coagulant pump 200 may deliver a coagulant to the system floc tubes 60, or any other convenient point for chemical constituent injection, such as aluminum sulfate, aluminum chlorohydrate, ferric chloride, ferric sulfate, polyamine, poly-DADMAC, polyaluminum chlorohydrate, or any one of a wide variety of commercially available coagulants. Similarly, the polymer pumps 210 may deliver cationic and anionic solutions at varying concentrations to the floc tubes 60, thereby permitting mixing of wastewater stream 1 and chemical additives as stream 1 passes through the floc tubes 60 into the tank 30.

Additionally, a pH pump 220, or a plurality thereof, may be provided for delivery of an alkaline or basic solution, or both, to balance the pH of the wastewater stream. As best seen in FIG. 2, a pair of pH pumps 220 may be provided, one at a point in wastewater stream 1 prior to the floc tubes 60, and one at a point downstream of the tank 30, whereby pH can be adjusted both prior to and subsequent to treatment of wastewater stream 1.

FIG. 3 is an example of a human management interface (HMI) for the controller 100 of FIGS. 1 and 2. As can be seen, the various devices within the system are represented in the HMI, e.g. the flotation tank, chemical feeds and pumps, etc. The HMI allows the operator to see every value for every controller and process in one screen. It also allows the operator to make changes via the touch screen, i.e. AUTO (on/off toggle) It also allows the operator to shut off the entire system with one button, i.e. STOP. This screen show the following: The water flow from the plant is 783 gpm. The water flow into the DAF is 744 gpm. Acid is at 152 ppm and 451 mls/min. Chemical pumps P-1600 and P-1402 are disabled. The coagulant is feeding 1114 ppm and the Anionic Flocculent is feeding 67 ppm. The pH going into the DAF is 6.16. The effluent going to the city is 138 TSS and the set points are 200 max., 150 mid., and 100 min. The time is 19:24:11 PST.

Thus, plurality of system 10 parameters are shown that may be input to the controller 100 and stored in data memory 102 to customize system operation for a wide variety of wastewater treatment applications. Parameters that may be set by an operator include a maximum turbidity level (NTUmax), a time period (TI) for which NTUmax must be present, a minimum set point for coagulant flow (COAGSPI), a maximum set point for coagulant flow (COAGSPMAX), and a flow increment rate for coagulant (COAGINC). Additionally, analogous parameters may be set for each additional additive used in the system.

Figure 4A:
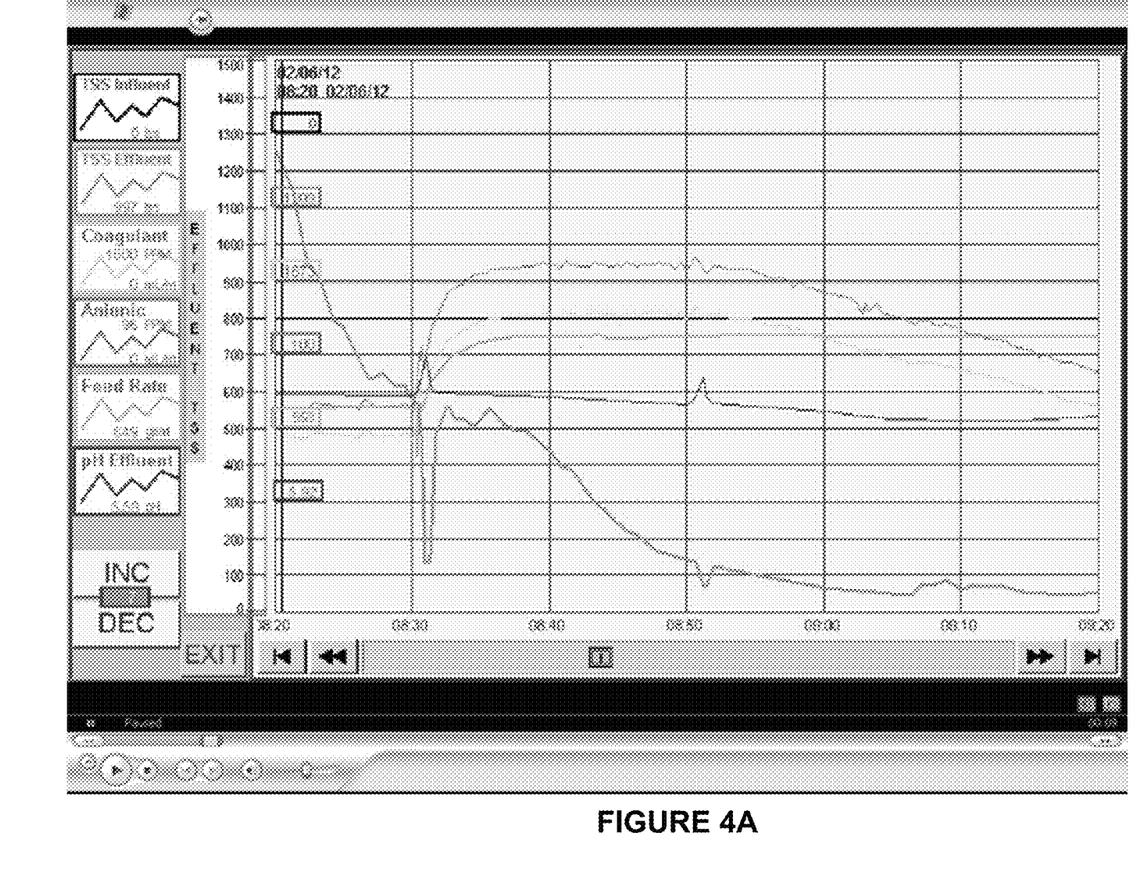
FIGS. 4A and 4B are graphs that show real time process parameters and corrections according to the invention.
Figure 4B:
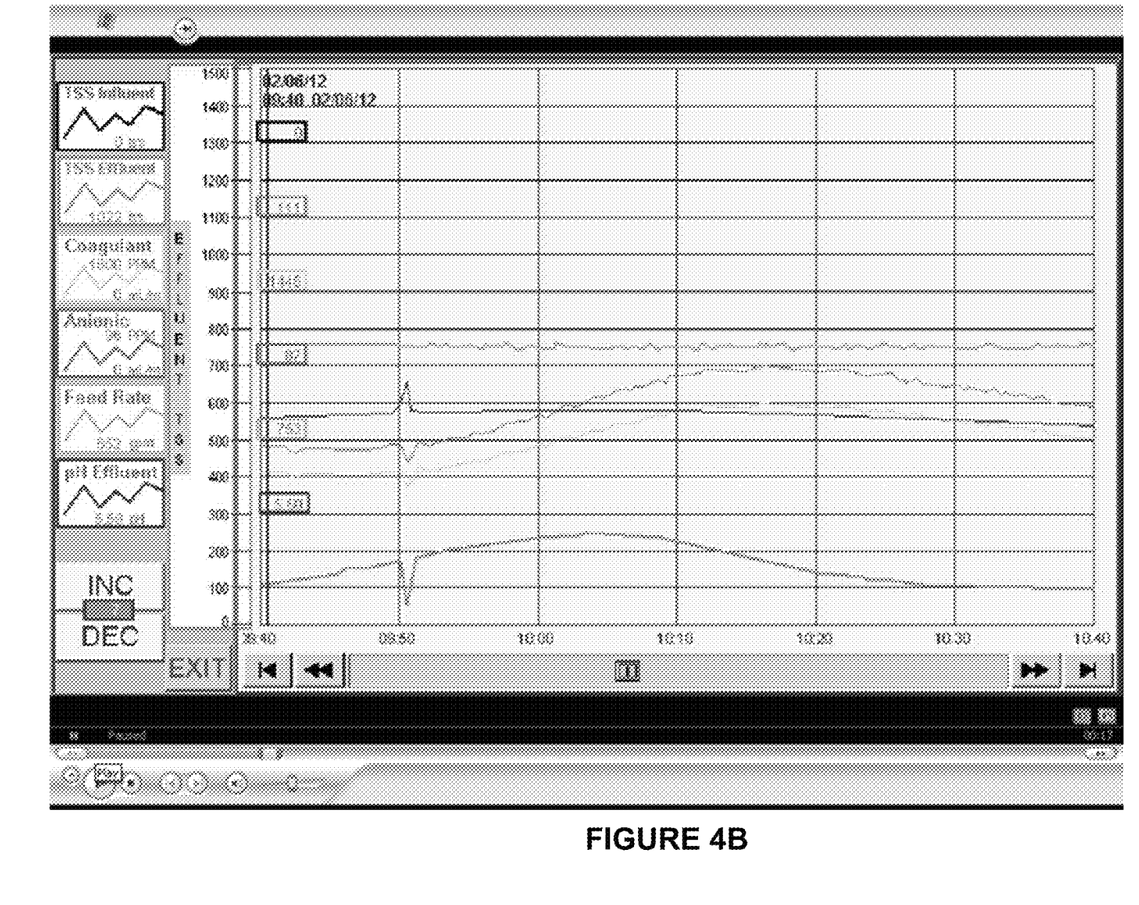

FIGS. 4A and 4B are graphs that show real time process parameters and corrections according to the invention. For purpose of example only, FIGS. 3 and 4A-4B assume the use of a single coagulant additive and a pair of polymer additives. Accordingly, the following parameters may be entered into controller 100 by an operator for each of polymer #1 and polymer #2 respectively: polymer minimum flow rate set points (POLYISPI, POLY2SP1), polymer maximum flow rate set points (POLYISPMAX, POLY2SPMAX), and a flow increment rate for each polymer (POLYIiNC, POLY2INC). It should be noted that the flow rates set by an operator may be specified as, for example, a parts per million (ppm) flow rate. These flow rate settings may then be scaled by the controller 100 to provide an output to pumps 200, 210, and 220 that is representative of the number of parts per million selected, based upon the flow rate of the wastewater entering the system, as read by the flow transmitter 140.

As can be seen in FIG. 4A, an interval of one hour, from 8:20 to 9:20, is shown. Values for TSS influent, TSS effluent, coagulant, anionic, feed rate, and pH effluent are plotted along the time access. These values are determined in real time during system operation based upon inputs from various sensors, discussed herein. It can be seen that the values are initially out of line for the TSS effluent, but at 8:30 chemical injection rates are increased and the TSS effluent value is brought under control. In this example, automatic operation was commenced at 8:30.

In FIG. 4B, a spike in values is shown at about 9:50. This is a result of a cleaning operation. For purposes of continued reliability in sensor readings it is necessary to perform periodic cleaning of the system components. For example, embodiments of the invention may comprise an automatic cleaning system for the sensors, comprising a clean water source, and a chemical addition system on a timer that interfaces with the PID. In this example, such cleaning is performed daily at the same time, e.g. 9:50.

As one example or parameters that may be provided via the operator interface 120, 100 percent coagulant solution may be provided at a minimum flow rate set point (COAG-SPI) of 50 parts per million (ppm), a maximum (COAG-MAX) of 00 ppm, and an increment (COAGINC) of 0 ppm. Similarly, 0.05% anionic polymer #1 solution may be provided at a minimum flow rate set point (POLY1SPI) of 8 ppm, a maximum (POLY1MAX) of 18 ppm, and an increment (POLY1iNe) of 2 ppm. Finally, a 0.05% cationic polymer #2 solution may be provided at a minimum flow rate set point (POLY2SP1) of 8 ppm, a maximum (POLY2MAX) of 26 ppm, and an increment (POLY1iNe) of 2 ppm. It will be understood that the above parameters are for purposes of explication and example only, and are in no way to be construed as limiting of the invention.

The wastewater stream 1 may be efficaciously treated by the system by conducting the following system operations. The steps in the processes described herein are conducted primarily through the application of programming instructions run in the controller 100, responsive to measured process variables supplied to controller 100 through its inputs 110 and the operator interface 120.

In accordance with one embodiment of the invention, the turbidity meter 160 may be replaced by a total suspended solids sensor (measured in NTU's) 160 provided in fluid communication with effluent outlet 50 for measuring the clarity of treated wastewater effluent. The total suspended solids sensor 160 comprises an output 162 that is representative of total suspended solids, as measured by any one of several methods, typically provided as a weight per unit volume or parts per million. The output 162 is operatively coupled to an input 110 of the controller 100. In this embodiment of the invention, the system treats a wastewater stream 1 to produce an effluent stream 2 having a contaminant concentration below a predetermined threshold. This embodiment of the invention operates in the same fashion as discussed herein above using turbidity as a variable, except that total suspended solids are used as the control variable of the system.

In this embodiment of the invention, total suspended solids (TSS) are continuously monitored rather than turbidity, either by a single TSS sensor 160 in the effluent stream 2 as shown in FIG. 1, or alternatively by a pair of TSS meters 160, one in the effluent stream 2 and one disposed between the floc tubes 60 and tank 30. Initially, the controller 100 is supplied with a predetermined TSS threshold, TSS max, which is input through the operator interface 120.

Accordingly, the invention provides a wastewater treatment system that may be controlled by any desired control variable required to be monitored to treat a particular effluent stream 2.

In a yet further non-limiting embodiment of the invention, biological oxygen demand (BOD) sensors, chemical oxygen demand (COD) sensors, and conductivity meters may be used in place of the turbidity or TSS sensor 160 to control the system using a plurality of input variables suited for the treatment demands of any given effluent stream 2. In this embodiment of the invention, the operator may still input a maximum acceptable threshold for each control variable in an analogous fashion to that discussed herein above, using turbidity or total suspended solids as control variables.

Computer Implementation

Figure 5:
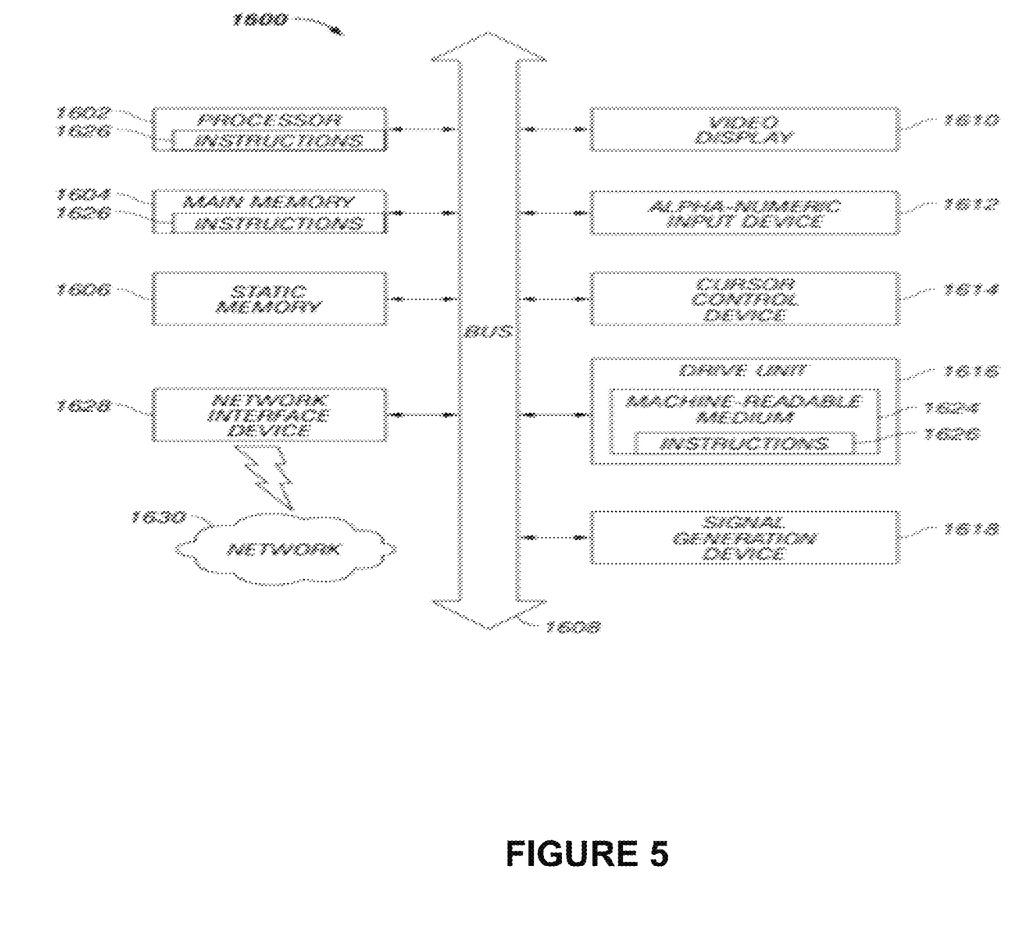
FIG. 5 is a block schematic diagram of a machine in the exemplary form of a computer system within which a set of instructions for causing the machine to perform any one of the foregoing methodologies may be executed.

FIG. 5 is a block schematic diagram of a machine in the exemplary form of a computer system 1600 within which a set of instructions for causing the machine to perform any one of the foregoing methodologies may be executed. In alternative embodiments, the machine may comprise or include a network router, a network switch, a network bridge, personal digital assistant (PDA), a cellular telephone, a Web appliance or any machine capable of executing or transmitting a sequence of instructions that specify actions to be taken.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e., software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g., a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the invention. Accordingly, the invention should only be limited by the Claims included below.

The invention claimed is:

1. A method for treating a wastewater stream to produce an effluent stream, the method comprising:
providing a plurality of pumps that supply a plurality of chemical additives at variable flow rates to said wastewater stream at a plurality of points;

providing a first total suspended solids sensor that is disposed within said wastewater stream downstream of said plurality of pumps and that continuously samples directly from the wastewater stream to monitor clarity of said wastewater stream;

using a proportional-integral-derivative (PID) controller to monitor flow rate of said wastewater stream, and vary the flow rates of said plurality of chemical additives based upon an algorithm employing each of:
a proportional term,
a derivative term set for a rapid response dosing scheme without overdosing due to an over-shoot, wherein the rapid response dosing scheme is achieved with a predetermined gain in a derivative loop, and
an integral term set to achieve a desired effluent quality, the value of which is pre-set, in the fastest time possible; and continually injecting, by the plurality of pumps based upon turbidity measurements made by the first total suspended solids sensor, said plurality of chemical additives into the wastewater stream in real time responsive to adjustments specified by the PID controller to keep the clarity of the effluent stream in a predetermined and set range.

2. The method of claim 1, comprising:
providing at least one coagulant pump that delivers a coagulant to said wastewater stream at a first variable flow rate; and
providing at least one polymer pump that delivers a polymer to said wastewater stream at a second variable flow rate.

3. The method of claim 1, comprising:
providing a second total suspended solids sensor that is disposed within said effluent stream and that continuously samples directly from the wastewater stream to monitor the clarity of said effluent stream.

4. The method of claim 3, comprising:
providing an output from said second total suspended solids sensor representative of effluent clarity that is operatively coupled to an input of said PID controller, wherein the PID controller changes the chemical dosing upon determining the output exceeds a predetermined threshold.

5. The method of claim 1, comprising:
providing a plurality of points of chemical injection through which said wastewater stream is passed and at which said chemical additives are injected into the wastewater stream.

6. The method of claim 5, wherein the first total suspended solids sensor is disposed downstream of a plurality of flocculent tubes.

7. The method of claim 1, comprising:
providing at least one pH meter in fluid communication with said wastewater stream having an output representative of the pH of said wastewater stream that is operatively coupled to said PID controller; and
providing at least one pH additive delivery pump that supplies an acidic or alkaline solution to said wastewater stream responsive to the output of said at least one pH meter.

8. The method of claim 1, comprising:
providing an automatic cleaning system for said first total suspended solids sensor, the automatic cleaning system comprising a clean water source, and a chemical addition system on a timer that interfaces with said PID controller.

9. The method of claim 1, further comprising:
setting said PID controller to meet a performance objective, a costing objective, or a combination of performance and costing objectives;
wherein said PID controller is set with a high gain for said proportional and integral terms to ensure a quick and thorough response to an elevation in contamination in the effluent stream, providing an acceptable level of chemical over-shooting where compliance is required; and
wherein said PID controller is set with lower values for the proportional and integral terms and a higher gain for the derivative terms, providing a less responsive system that minimizes chemical over-shooting where maximum cost efficiency is required.

10. The method of claim 1, further comprising:
setting gain for said integral term at a highest value possible for quickest system recovery to return water quality to an acceptable level for discharge in a shortest time possible;
wherein a large amount of variation in contaminant loading requires a higher gain in the integral term to accommodate loading swings; and
wherein a low amount of variation in contaminant loading requires a lower gain in the integral term.

11. The method of claim 1, further comprising:
setting gain for the derivative term at a highest value possible to ensure a lowest chemical over-shoot;
wherein a small amount of variation in contaminant levels requires a higher gain value in the derivative term to provide small changes in chemical necessary dosages with a minimal amount of over-shooting;
wherein a large amount of variation in levels of contamination requires a smaller gain in the derivative term to provide a quick recovery back to a desired set point; and
wherein said desired set point is that which provides a desired water quality for a concentration of contaminants being treated.

12. A method for treating a wastewater stream to produce an effluent stream, the method comprising:
providing a flow meter that continually monitors flow rate of the wastewater stream;
providing a pump that continually injects a chemical additive into the wastewater stream responsive to real-time adjustments specified by a proportional-integral-derivative (PID) controller;
providing a sensor that continually monitors clarity of the wastewater stream by sampling directly from the wastewater stream, wherein the sensor is disposed within the wastewater stream downstream of the pump;
using the PID controller to determine an appropriate chemical additive flow rate by
receiving a flow rate value for the wastewater stream from the flow meter,
receiving a clarity value for the wastewater stream from the sensor,
automatically determining the appropriate chemical additive flow rate needed to achieve a desired effluent quality level specified by a user,
wherein the appropriate chemical additive flow rate is based at least in part on the flow rate value, the clarity value, and a predetermined gain value,
output a chemical additive flow rate signal to the pump that specifies an amount of the chemical additive to be injected into the wastewater stream by the pump, and continually monitor the flow rate value and the clarity value for the wastewater stream in real time to determine whether an adjustment of the appropriate chemical additive flow rate is needed to maintain the clarity of the effluent stream at a substantially steady level after reaching the desired effluent quality level; and causing the pump to inject the amount of the chemical additive into the wastewater stream responsive to receiving the chemical additive flow rate signal from the PID controller.

13. The method of claim 12, wherein the sensor is a turbidity meter or a total suspended solids sensor.

14. The method of claim 12, wherein the predetermined gain value is based on a dosing scheme selected by the user.

15. The method of claim 12, wherein the pump is one of a plurality of pumps that are each operatively coupled to the PID controller, and wherein each of the plurality of pumps is associated with a different chemical additive.

16. The method of claim 15, wherein the PID controller is configured to output a distinct flow rate signal to each of the plurality of pumps, and wherein each distinct flow rate signal is adjusted in real time based on the flow rate and the clarity of the wastewater stream.

* * * * *